United States Patent Office 3,503,934
Patented Mar. 31, 1970

3,503,934
MANUFACTURE OF POLYURETHANE SOLUTIONS
Kenneth William Chilvers, Manchester, England, assignor to Imperial Chemical Industries Limited, London, England, a corporation of Great Britain
No Drawing. Filed Oct. 4, 1966, Ser. No. 584,110
Claims priority, application Great Britain, Oct. 6, 1965, 42,418/65
Int. Cl. C08g 22/08, 22/18
U.S. Cl. 260—75          7 Claims

ABSTRACT OF THE DISCLOSURE

A process for the manufacture of a solution of a polyurethane in an inert solvent which comprises the steps of (1) interacting in said solvent one molar portion of hydroxyl terminated polyester or polyesteramide, between 1.2 and 2.5 molar portions of organic diisocyanate and between 0.25 and 1.0 molar proportions of a mixture of water and polyhydric alcohol of molecular weight at most 250 having at least 25 molar percent of water, and, when the viscosity of the solution is between 1 and 1500 poises measured at 25° C.; (2) adding an isocyanate-reactive compound in molar amount at least substantially equal to the molar amount of isocyanate groups unreacted at the end of step (1).

---

This invention relates to an improved process for the manufacture of solutions of polyurethanes, and is a modification of the process described and claimed in U.S. Patent No. 3,373,143 of Mar. 12, 1968.

In U.S. Patent No. 3,373,143, there is described and claimed a process for the manufacture of a solution in an inert organic solvent of a polyurethane which comprises the steps of (1) interacting in said solvent 1 molar proportion of a hydroxyl-terminated polyester or polyesteramide, between 1.2 and 2.5 molar proportions of an organic diisocyanate and between 0.25 and 1.0 molar proportions of water, and, when the viscosity of the solution is between 1 and 1500 poises measured at 25° C.; (2) adding an isocyanate-reactive compound in molar amount at least substantially equal to the molar amount of isocyanate groups unreacted at the end of step (1). It has now been found that polyurethane solutions of even higher stability are obtained if a portion of the water is replaced by a polyhydric alcohol.

Thus according to the present invention there is provided a process for the manufacture of a solution in an inert organic solvent of a polyurethane which comprises the steps of (1) interacting in said solvent 1 molar proportion of a hydroxyl-terminated polyester or polyesteramide, between 1.2 and 2.5 molar proportions of an organic diisocyanate and between 0.25 and 1.0 molar proportions of a mixture of water and a polyhydric alcohol of molecular weight at most 250 having at least 25 molar percent of water and, when the viscosity of the solution is between 1 and 1500 poises measured at 25° C.; (2) adding an isocyanate-reactive compound in molar amount at least substantially equal to the molar amount of isocyanate groups unreacted at the end of step (1).

As examples of polyhydric alcohols which may be used, there may be mentioned ethylene glycol, 1,4-, 1,3- and 2,3-butanediols, diethylene glycol, dipropylene glycol, pentamethylene glycol, hexamethylene glycol, neopentylene glycol, propylene glycol, glycerol, hexanetriols, trimethylolpropane, pentaerythritol and low molecular weight reaction products of the above polyols with propylene oxide.

As examples of organic solvent there may be mentioned any organic solvent which is inert towards isocyanate and hydroxyl groups, preferred solvents being esters, ketones, aromatic hydrocarbons and/or chlorohydrocarbons. The amount of solvent used is preferably sufficient to give a solution containing from 10 to 80% of polyurethane.

The hydroxyl-terminated polyester or polyesteramide used in the process of my invention should be essentially linear and may be prepared by conventional methods, for example from dicarboxylic acids, glycols and, as necessary, minor proportions of diamines or aminoalcohols. Suitable dicarboxylic acids include, for example, succinic, glutaric, adipic, suberic, azelaic, sebacic, phthalic, isophthalic and terephthalic acids and mixtures of these. Suitable glycols include, for example, ethylene glycol, 1:2-propyleneglycol, 1:3-butylene glycol, 2:3-butyleneglycol, diethylene glycol, tetramethylene glycol, pentamethylene glycol, hexamethylene glycol, decamethylene glycol and 2:2-dimethytrimethylene glycol. Suitable diamines or amino-alcohols include, for example, hexamethylene diamine, ethylene diamine, monoethanolamine, phenylenediamines and benzidine. Small proportions of polyhydric alcohols for example glycerol or trimethylolpropane may also be used, but large amounts of such compounds leads to undesirable solvent-insolubility. The polyesters and polyesteramides should preferably have acid value less than 5 mg. KOH/g. and a molecular weight between 800 and 5000, and preferably between 1000 and 2700. Mixtures of polyesters and polyesteramides may be used if desired.

Especially valuable polyurethane solutions are obtained if polyesteramides containing one amido group for each 1500 to 12,000 units of molecular weight are used. The preferred quantities of diisocyanate, polyhydric alcohol and water for reaction with one mol. of such a polyesteramide are between 1.3 and 1.6 mol. of diisocyanate and between 0.3 and 0.6 mol. of the mixture of water and polyhydric alcohol, so that the overall NCO:active H ratio lies between 0.8:1 and 1.25:1.

Examples of suitable organic diisocyanates include aliphatic diisocyanates, for example hexamethylene diisocyanate, aromatic diisocyanates, for example, tolylene-2:4-diisocyanate, tolylene-2:6-diisocyanate, diphenylmethane - 4:4'-diisocyanate, 3-methyldiphenylmethane-4:4'-diisocyanate, m- and p-phenylenediisocyanate, chlorophenylene-2:4-diisocyanate, naphthylene-1:5-diisocyanate, naphthylene-1:4-diisocyanate, diphenyl-4:4'-diisocyanate, 4:4'-diisocyanate-3:3'-dimethyldiphenyl, diphenylether diisocyanates, and cycloaliphatic diisocyanates for example, dicyclohexylmethane diisocyanate and methylcyclohexyldiisocyanate. Mixtures of these diisocyanates may be used, the preferred diisocyanate being a mixture of 2,4- and 2,6-tolylene diisocyanates containing about 82% of the 2,4-isomer.

Step (1) of the process of the invention may be carried out at any temperature between 40 and 130° C., but temperatures between 50 and 80° C., are preferred. It may however be desirable to reduce the temperature to below these ranges near the end of the reaction in order to facilitate control of the reaction.

It has also been found that the polymerisation may be accelerated by catalysts of the types used in reactions between isocyanates and compounds containing active hydrogen, such as organic and inorganic basic compounds, and soluble organic compounds of metals, for example of transition metals, such as iron and manganese acetyl acetonate, and of tin and antimony, for example dibutyl tin dilaurate and stannous octoate, compounds of lead such as lead acetate, basic lead acetate and lead 2-ethylhexoate. As basic organic catalysts tertiary amines are suitable, for example, triethylenediamine, dimethylbenzylamine, and dimethylcyclohexylamine, but 4-dimethylaminopyridine is preferred since its use allows a good control of the viscosity at the end of step (1).

Step (2) of the process of the invention may be carried out at any temperature, from room temperature to a temperature of 130° C.

As examples of isocyanate-reactive compounds which may be used in step (2) there may be mentioned any compound containing hydroxyl, or primary or secondary amino groups. The isocyanate-reactive compound may be monofunctional, as for example a monohydric alcohol such as methanol, a phenol, or a primary or secondary monoamine, or may be polyfunctional, for example polyhydric alcohols, polyamines, amino alcohols and phenolalcohols. As examples of such compounds, there may be mentioned ethylene glycol, diethylene glycol, 2:3-butylene glycol, tetramethylene glycol, trimethylolpropane, hydrazine, ethylene diamine, hexamethylene diamine, N:N'-disubstituted ethylene diamines, m- and p-phenylene diamines, 2,4-, 2,6- and 3,5-tolylenediamines, and 4,4'- and 2,4'-diaminodiphenylmethanes. It is preferred to use polyfunctional isocyanate-reactive compounds since they lead to surface-coatings and adhesives of improved properties. Of the organic polyfunctional isocyanate-reactive compounds, it is preferred to use compounds in which the reactive groups are not all of the same reactivity towards the isocyanate group as for example in 1:2-propyleneglycol, glycerol, 1:3-butylene glycol, ethanolamine, diethanolamine and saligenin since these compounds give a better control of the viscosity.

The amount of isocyanate-reactive compound needed depends upon the amount of unreacted isocyanate groups which will vary with the polyesters or polyesteramides and diisocyanates used and amounts of these and also the extent to which it is necessary to carry out reaction in order to achieve the required viscosity. The amount of unreacted isocyanate groups can be determined by conventional methods and the necessary minimum usage of isocyanate-reactive compound then calculated on the basis of a molar amount for each molar amount of free isocyanate groups, i.e. so that for each isocyanate group there is one molecule of isocyanate-reactive compound. However this procedure is frequently inconvenient and it has been found in general entirely satisfactory to add an amount of isocyanate-reactive compound such that there is a molar amount of such compound for each molar amount of diisocyanate in excess of that required to react with the polyester or polyesteramide alone. This will normally involve the use of an excess of isocyanate-reactive compound but this does not interfere with the process of the invention and is not necessarily a disadvantage in the application of the products of the invention in the preparation of for example surface-coatings or adhesives, although it may make the use of additional polyisocyanate desirable at the curing stage. In the case, however, where the isocyanate-reactive compound contains primary or secondary amino groups it is desirable to deactivate any excess, for example, by treatment with a reactive ester such as diethyl carbonate, since the primary or secondary amino groups may cause some degradation of the polyester groups forming part of the polymer chain.

Use of less than the molar quantity of isocyanate-reactive compound may lead to difficulty in the control of viscosity and result in polyurethane solutions of decreased storage stability although such solutions, when freshly prepared, afford satisfactory surface coatings or adhesives.

When catalysts have been used in step (1) subsequent deactivation for example with an acidic compound is desirable, since such catalysts if left in the reaction mixture may give rise to shortened storage life or pot life at the application stage. Examples of suitable acidic compounds include sulphur dioxide, organic acids, such as adipic acid, salicylic acid and inorganic acids such as phosphoric acid or hydrochloric acid.

The solutions prepared by the process of the invention are of especial value in the manufacture of flexible coatings and adhesives. Substrates for these include textiles of natural, artificial or synthetic materials, rubber, paper, wood, leather, metals, glass, plastics such as polyvinyl chloride and polyurethane materials such as flexible and rigid foams.

Such solutions are particularly advantageous when used as adhesives in the lamination of plastic sheet material to a substrate. Examples of such substrates are knitted, woven or felted materials, flexible and rigid foams made from polyvinyl chloride or polyurethane. Hitherto, the lamination of plastic materials to such substrates has been found difficult to achieve. Using an adhesive solution made by the process of the invention, a permanent bond may be made between these materials by conventional laminating techniques.

For application to these substrates the solutions are mixed with organic polyisocyanates which may contain two or more isocyanate groups, applied to the substrates by any conventional method, and the coatings so obtained are cured at any temperature between room temperature and 180° C. Organic polyisocyanates which may be used for curing include those known from the prior art to be useful for the preparation of polyurethanes, for example those diisocyanates mentioned above as suitable for the preparation of the polyurethane solution. Polyisocyanates containing more than two isocyanate groups per molecule may however be used. Examples of such polyisocyanates include the reaction products of an excess of diisocyanate with trihydric alcohols or mixtures of dihydric and trihydric alcohols, isocyanate group-containing isocyanurate polymers of diisocyanates and polyisocyanates, as well as aromatic triisocyanates such as 2:4:4'-triisocyanatodiphenylether and 2:4:6-triisocyanatotoluene. The proportion of polyisocyanate used for curing is desirably from about 8% to 25% by weight of the solids content of the polyurethane solution, but amounts outside this range may be used if desired, especially if an excess of isocyanate-reactive compound is used for stabilisation. When diisocyanates or polyisocyanates are used curing temperatures preferably should be between room temperature and 100° C. Isocyanate generators, such as adducts of polyisocyanates with phenols may also be used in which case curing temperatures between 70° C. and 180° C. are necessary.

The polyurethane solutions may also be converted, preferably after the addition of further polyisocyanate, into elastomeric filaments by conventional wet or dry spinning methods. The inert organic solvent may for example be removed by spinning into a solvent which is miscible with the inert organic solvent but is not a solvent for the polymer or by passing a stream of hot gas such as air over the filament after spinning.

The invention is illustrated but not limited by the following examples in which parts are by weight:

EXAMPLE 1

A mixture of 1533 parts of a polyesteramide (obtained as described below), 2108 parts of methyl ethyl ketone, 2.08 parts of water, 10.75 parts of ethylene glycol, 0.77 part of dimethylaminopyridine and 188.5 parts of an 80:20 mixture of 2,4- and 2,6-tolylene diisocyanates is stirred at 57 to 63° C. until the viscosity of a sample measured at 25° C. reaches a value between 100 and 140 poises. 13.5 parts of methanol are then added and the mixture is stirred at the same temperature for 3 hours. 0.38 part of salicylic acid is then added and the mixture is stirred at the same temperature for 1 hour, then cooled.

The amount of water stated is the total present, the actual amount added taking into account any small amounts present in the solvent.

The polyesteramide used in the above example can be obtained by heating a mixture of 4330 parts of adipic acid, 1820 parts of ethylene glycol, 177 parts of diethylene glycol and 113 parts of monoethanolamine at 240° C.

under reflux until an acid value of 2.0 to 3.0 mg. KOH/gram is obtained and has a molecular weight of 1850.

EXAMPLE 2

A mixture of 21,800 parts of polyesteramide used in Example 1, 30,000 parts of methyl ethyl ketone, 10.9 parts of dimethylaminopyridine, 43.6 parts of water, 122 parts of ethylene glycol and 2720 parts of an 80:20 mixture of 2,4- and 2,6-tolylene diisocyanates is stirred at 57 to 63° C. until the viscosity of a sample measured at 25° C. reaches a value between 2½ and 4 poises. 260 parts of methanol are added and the mixture is stirred for 3 hours. 10.9 parts of salicylic acid are then added and the mixture is stirred for 1 hour and then cooled.

EXAMPLE 3

51.0 parts of an 80:20 mixture of 2:4- and 2:6-tolylene diisocyanates are added to a solution containing 400 parts of a poly(hexamethylene adipate) polyester, 0.9 part of water, 3.1 parts of ethylene glycol, 0.2 part of 4-dimethylaminopyridine and 550 parts of ethyl acetate. The solution is raised to a temperature of 60° C. under a nitrogen atmosphere, and maintained at this temperature until the viscosity of a sample measured at 25° C. reaches 50–60 poises. 2.7 parts of ethanolamine are then added and stirred in. This provides a quantity of amine groups which is 1.5 times the amount required to completely react with the isocyanate groups present. The solution is maintained at 60° C. for three hours and 0.23 part of salicylic acid is added. After stirring for a further hour at 60° C. the product is cooled and discharged.

The polyester used in this example is prepared by heating a mixture of 1610 parts of hexamethylene glycol and 1725 parts of adipic acid at 240° C. and has an acid value of 1.8 mgm. KOH/g. and a hydroxyl value of 54.6 mgm. KOH/g.

EXAMPLE 4

51.8 parts of an 80:20 mixture of 2:4- and 2:6-tolylene diisocyanate are added to a solution containing 400 parts of a poly(ethylene adipate) polyester, 0.9 part of water, 3.1 parts of ethylene glycol, 0.2 part of 4-dimethylaminopyridine and 550 parts of ethyl acetate. The solution is heated to 60° C. and maintained at this temperature under a nitrogen atmosphere, when the viscosity of a sample measured at 25° C. reaches 50–60 poises. 2.7 parts of ethanolamine are added and stirred in. This provides a quantity of amine groups which is 1.5 times that necessary to completely react with the isocyanate groups present. The solution is maintained at 60° C. for three hours, 0.23 part of salicylic acid added, and, after stirring for a further hour at 60° C., the product is cooled and discharged.

The polyester used in this example is prepared by heating a mixture of 3614 parts of ethylene glycol and 7560 parts of adipic acid to an acid value of 1.6 mgm. KOH/g. and a hydroxyl value of 54.3 mgm. KOH/g.

I claim:
1. A process for the manufacture of a solution of a polyurethane in an inert solvent which comprises the steps of (1) interacting in said solvent 1 molar proportion of a hydroxyl terminated polyester or polyesteramide, between 1.2 and 2.5 molar proportions of an organic diisocyanate and between 0.25 and 1.0 molar proportions of a mixture of water and polyhydric alcohol of molecular weight at most 250 having at least 25 molar percent of water, and, when the viscosity of the solution is between 1 and 1500 poises measured at 25° C.; (2) adding an isocyanate-reactive compound selected from the group consisting of monofunctional and polyfunctional alcohols, phenols, and primary and secondary amines in molar amount at least substantially equal to the molar amount of isocyanate groups unreacted at the end of step (1).

2. A process as claimed in claim 1 wherein there is used a polyesteramide containing one amido group for each 1500 to 12,000 units of molecular weight.

3. A process as claimed in claim 1 wherein the reaction between the polyester or polyesteramide, organic diisocyanate, water and polyhydric alcohol is carried out in the presence of a catalytic amount of 4-dimethylaminopyridine.

4. A process as claimed in claim 1 wherein the isocyanate reactive compound is a compound having a plurality of isocyanate-reactive groups having different reactivity towards the isocyanate group.

5. A process as claimed in claim 4 wherein the isocyanate reactive compound is ethanolamine.

6. A process for coating a substrate which comprises mixing a polyurethane solution prepared by a process claimed in claim 1 with a polyisocyanate, applying the mixture so obtained to the substrate, and curing the mixture at a temperature between room temperature and 180° C.

7. A process as set forth in claim 1 in which said polyhydric alcohol is ethylene glycol.

References Cited

UNITED STATES PATENTS

| 2,929,800 | 3/1960 | Hill | 260—77.5 |
| 3,373,143 | 3/1968 | Chilvers et al. | 260—75 |
| 3,384,624 | 5/1968 | Heiss | 260—77.5 |

FOREIGN PATENTS

| 1,044,155 | 9/1966 | Great Britain. |
| 1,358,183 | 3/1964 | France. |

DONALD E. CZAJA, Primary Examiner

H. S. COCKERAM, Assistant Examiner

U.S. Cl. X.R.

117—124, 132, 138.8, 142, 148, 155; 156—331; 161—190; 260—32.8, 77.5